(12) United States Patent
Perry et al.

(10) Patent No.: US 6,889,761 B2
(45) Date of Patent: May 10, 2005

(54) MIXING DEVICE FOR AIR CONDITIONING SYSTEM

(75) Inventors: Steven P. Perry, Rochester Hills, MI (US); Christophe Sterle, Rochester Hills, MI (US)

(73) Assignee: Valeo Climate Control Corp, Auburn Hills (*) Notice: Subject to any disclaimer, the term of this patent is extended or adjusted under 35 U.S.C. 154(b) by 73 days.

(21) Appl. No.: 10/134,692

(22) Filed: Apr. 30, 2002

(65) Prior Publication Data

US 2003/0201096 A1 Oct. 30, 2003

(51) Int. Cl.$^7$ .............................. B60H 1/00; B60H 3/00
(52) U.S. Cl. .................. 165/202; 165/42; 165/103; 454/160
(58) Field of Search ............................ 165/42, 43, 103, 165/202; 454/156, 160, 161; 237/12.3 A, 12.3 B (56) References Cited

U.S. PATENT DOCUMENTS

| | | | | |
|---|---|---|---|---|
| 4,852,638 A | * | 8/1989 | Hildebrand et al. | 165/42 |
| 4,972,992 A | * | 11/1990 | Scheidel et al. | 165/103 X |
| 5,988,263 A | * | 11/1999 | Schwarz | 165/42 X |
| 6,007,421 A | * | 12/1999 | Schwarz | 454/156 |
| 6,106,386 A | * | 8/2000 | Schwarz | |
| 6,484,755 B1 | * | 11/2002 | Schwarz | 165/43 X |

* cited by examiner

*Primary Examiner*—Ljiljana Ciric
(74) *Attorney, Agent, or Firm*—Ronald Courtney

(57) ABSTRACT

An air flow mixing system for a vehicle air conditioning system having a distribution door to force air from a first air flow to mix with a second air flow of different temperature proximate a merging region in the air conditioning system. In one embodiment, the distribution door has an arcuate passageway or scoop to forcibly route air from the first airflow to the second airflow. In a second embodiment, the distribution door has at least one projecting channel to divide each of the first and second air flows into a plurality of alternating flow paths to promote heat transfer and mixing of the two airflows. In each embodiment, the pivoting distribution door facilitates heat transfer between the airflows resulting in a more even temperate airflow emerging from the merging region.

14 Claims, 7 Drawing Sheets

MIXING DEVICE FOR AIR CONDITIONING SYSTEM

FIELD OF THE INVENTION

The present invention relates to the field of air conditioning systems, and more specifically to air mixing systems within air conditioning systems.

BACKGROUND TO THE INVENTION

Vehicle air conditioning systems are well known in the art. Such systems conventionally include an air duct, which is selectively connected to the external air or to the interior of the vehicle cabin, a fan for causing the air to flow, and an evaporator unit within the duct for cooling the air. The cold air output from the evaporator unit may be supplied directly to various outlets within the vehicle cabin or some of the cold air may be passed through a heating heat exchanger whose heated air output is mixed with the cold air to provide temperature control of the air output to the cabin. Diversion of the cold air through the heat exchanger is controlled by a so-called "blend door", which in one extreme position causes all of the cold air to flow through the heat exchanger and in the opposite extreme position causes none of the air to flow through the heat exchanger. In intermediate positions different proportions of cold air and heated air can be provided.

Figure 1:
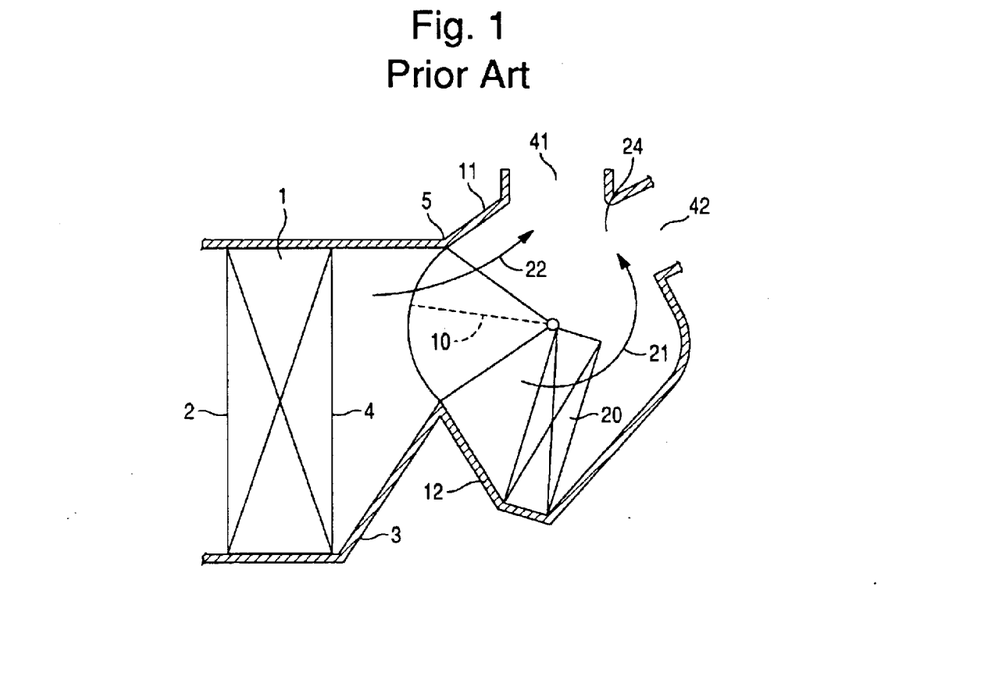
FIG. 1 shows a cross-sectional view through a known vehicle air conditioning system.

As will be seen in FIG. 1, the cold airflow 22 is concentrated on one side of the air duct and the hot air 21 to the other side.

In modern vehicles, there are a number of air outlets into the vehicle cabin and these outlets are connected to the air duct by a corresponding number of output ducts. Two such ducts are shown in FIG. 1. As will be seen with reference to FIG. 1, a first upper duct 41 is disposed on the side of the system which will tend to provide cold air and the second lower duct 42 is disposed on the side of the system which will tend to provide hot air. When the temperature of the upper duct 41 and lower duct 42 are different, this is known as bi-level stratification.

It is desirable to be able to provide air outlets which are all at substantially similar temperatures. This may not be possible in the prior art arrangements due to the above-mentioned spatial distribution of air temperature within the air conditioning system.

Attempts have been made to provide improved mixing of hot and cold air at the output of an air conditioning system; however, these attempts have caused unacceptable temperature stratification and pressure drops, as well as substantial increases in manufacturing costs due to complex parts and assemblies.

SUMMARY OF THE INVENTION

It is an object of the present invention to provide improved mixing of air within an air conditioning system.

In accordance with this invention, the present invention provides a mixing structure that mixes different airflows more efficiently within a limited space. The present invention may be structured to guide more cold air to the floor registers and more hot air to the panel registers as compared to the conventional designs with the goal of reducing bi-level stratification.

Moreover, the invention may increase the hot air flow velocity to penetrate the cold airflow to thereby reduce bi-level stratification.

The present invention may also be structured to avoid a permanently installed cross flow baffle that generates pressure drop in the cold air path, whereby in all blend positions including a full-cold position. In such case, the stratification control door is rotated aside in the full-cold position.

According to a first aspect of the invention there is provided an air flow mixing system for a vehicle air conditioning system having a first conduit for a first air flow, a second conduit for a second air flow, an opening between said first and second conduits for merging said first and second air flows in a merging region and a common air channel for said merged air flows. The mixing structure comprising a first side upstream of said merging region, a second side upstream of said merging region, and a substantially arcuate or curved passageway leading from said first side to said second side for mixing said first and second air flows at the merging region.

In the preferred embodiment, the mixing structure comprises a distribution door having a cold air side and a hot air side upstream of said merging region, whereby the distribution door includes a substantially arcuate or curved passageway disposed between the hot air side and the cold air side for mixing these first and second air flows at the merging region.

According to a second aspect of the invention, there is provided a vehicle air conditioning system having a heat exchanger disposed in a first conduit for providing a first heated air flow, a second conduit for a second air flow, an opening between said first and second conduits for merging said first and second air flows in a merging region, and a mixing structure. The mixing structure comprising a first side upstream of the merging region, a second side upstream of the merging region that is opposite the first side, at least one projection projecting from the first side, and at least one channel respectively passing through the at least one projection and leading from the first side to the second side. The second aspect of the invention includes at least one air passage opening at openings into said merging region for dividing said first heated air flow at an inlet region into plural air flows leading to the merging region and at least one u-shaped opening facing the second airflow, whereby the first heated air flow and second air flow mix in said merging region.

Preferably, the mixing structure is formed as part of the mixing and/or distribution doors.

DESCRIPTION OF THE PREFERRED EMBODIMENTS

In the Figures like reference numerals refer to like parts.

Figure 2:
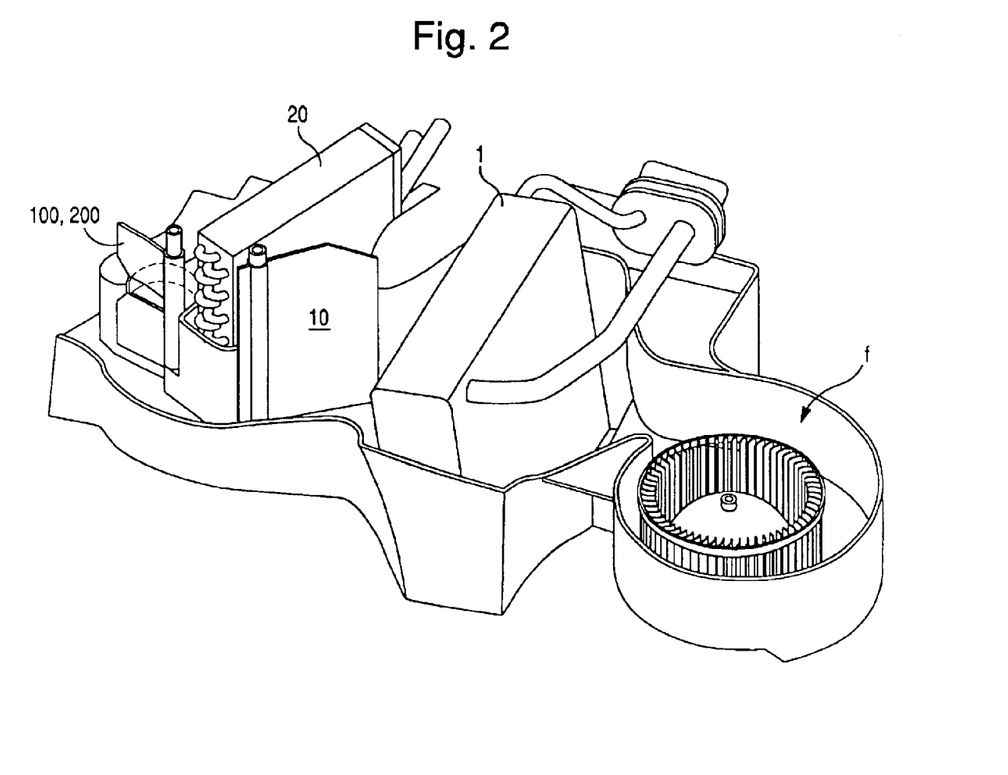
FIG. 2 is a partial perspective view of an air conditioning system similar to FIG. 1 and incorporating a first embodiment of the distribution door of the invention.

Referring first to FIGS. 1 and 2, an evaporator unit 1 has an input side 2. Air is urged into the input side 2 of the evaporator 1 by the movement of a vehicle in which the air conditioning system is mounted, or by a fan 'f' (see FIG. 2). The evaporator 1 is disposed in an air duct 3 and the evaporator 1 has an output side 4 from which emerges cooled air. The output duct 3 extends to a throat portion 5 which co-operates with a blend door 10. The blend door as shown in FIG. 1 may be positioned in a central position to define a first conduit for cold air flow between the blend door 10 and first wall 11 of the duct 3 and a second conduit for air to be heated between the opposite wall 12 of the duct 3. The second conduit leads to a heat exchanger core 20 which is supplied with hot water, for example from the engine of the vehicle, and which has an output side from which emerges a flow 21 of heated air. The flow 21 of heated air and a cool air flow 22 from the first conduit come together in a mixing region 24 of the duct 3. Two distribution ducts, 41 and 42 are shown in FIG. 1 and these, as has previously been discussed supply air outlets in different parts of the vehicle cabin, e.g. panel or face and/or foot and/or defrost areas.

It would be understood by one skilled in the art that although some mixing of the hot and cold air flows will take place in the mixing region 24, nonetheless the flow resistance caused by the heat exchanger core 20 will substantially reduce the velocity of the hot air and, as a result, on the extreme left of the duct 3, as seen in the direction of flow, the cold air will predominate and, on the extreme right of the duct 3 as seen in the direction of flow, hot air will dominate. Thus distribution duct 41 is more likely to contain cool air and distribution duct 42 is more likely to carry warm air. Additionally, the specific arrangement of the system downstream of the mixing region 24 may vary considerably depending on the environment and application for the air conditioning system.

Figure 3A:
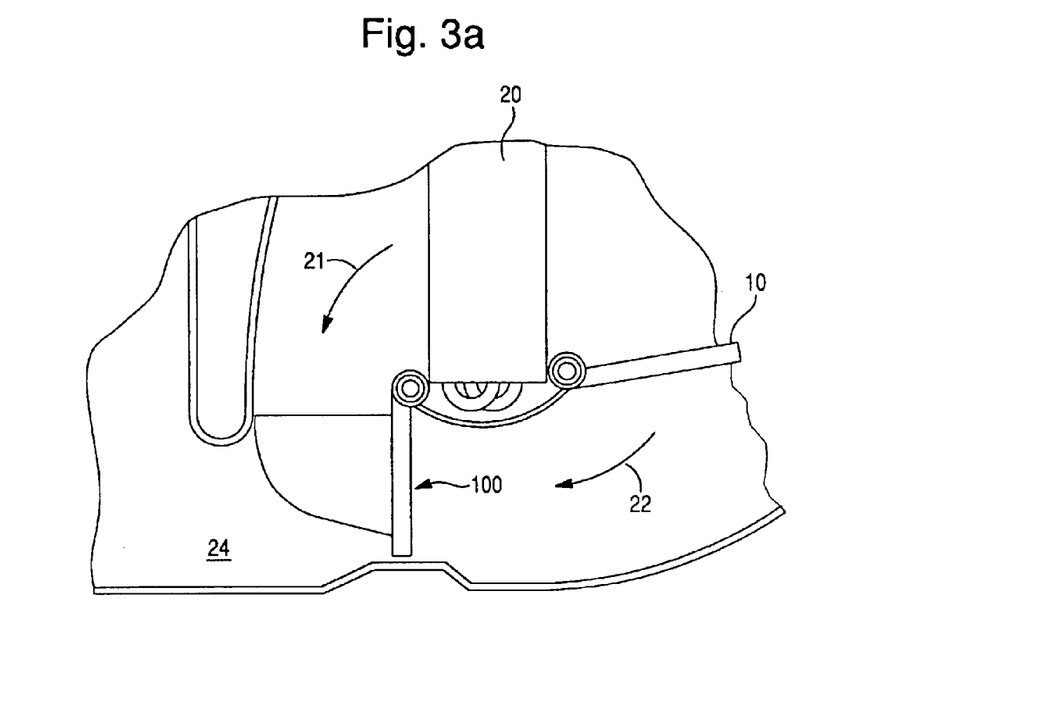
FIGS. 3a and 3b illustrate partial top views showing convergence of the hot air flow and cold airflow at the mixing region with the distribution door shown in two different positions.
Figure 3B:
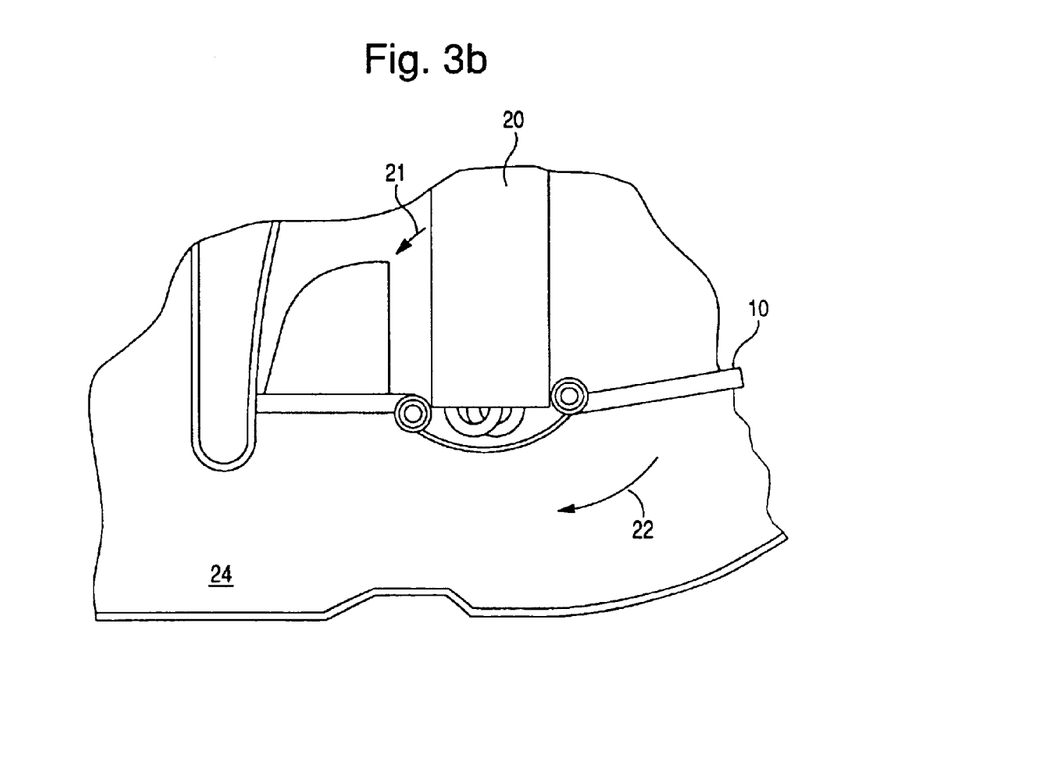

Referring now to FIGS. 2, 3a, 3b and according to the teachings of the invention, a distribution door 100, 200 is disposed at the mixing region 24 to efficiently control distribution and stratification of the different airflows. The distribution door 100, 200 of the present invention may take different forms, and by way of example, the instant invention shows a u-channel door structure (see FIGS. 4 and 5) and a cross-flow-channels door (see FIGS. 6 and 7). FIG. 8 further depicts a schematic representation of arrangement of the mixing device disposed in a vehicle air conditioning system.

Figure 4:
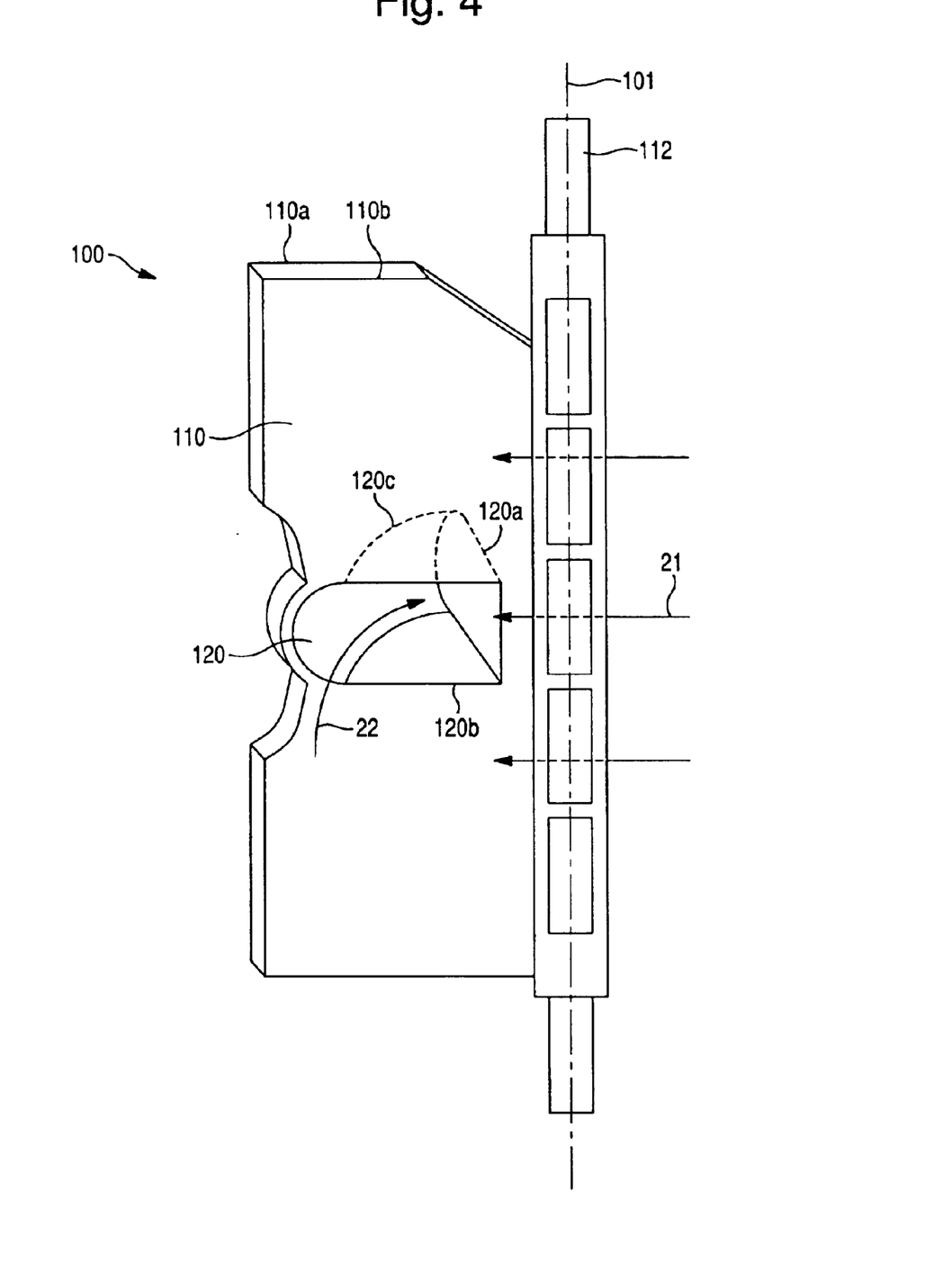
FIG. 4 is a front perspective view of the distribution door according to a first embodiment of the present invention in the form of a u-shaped hole or scoop in the door.
Figure 5:
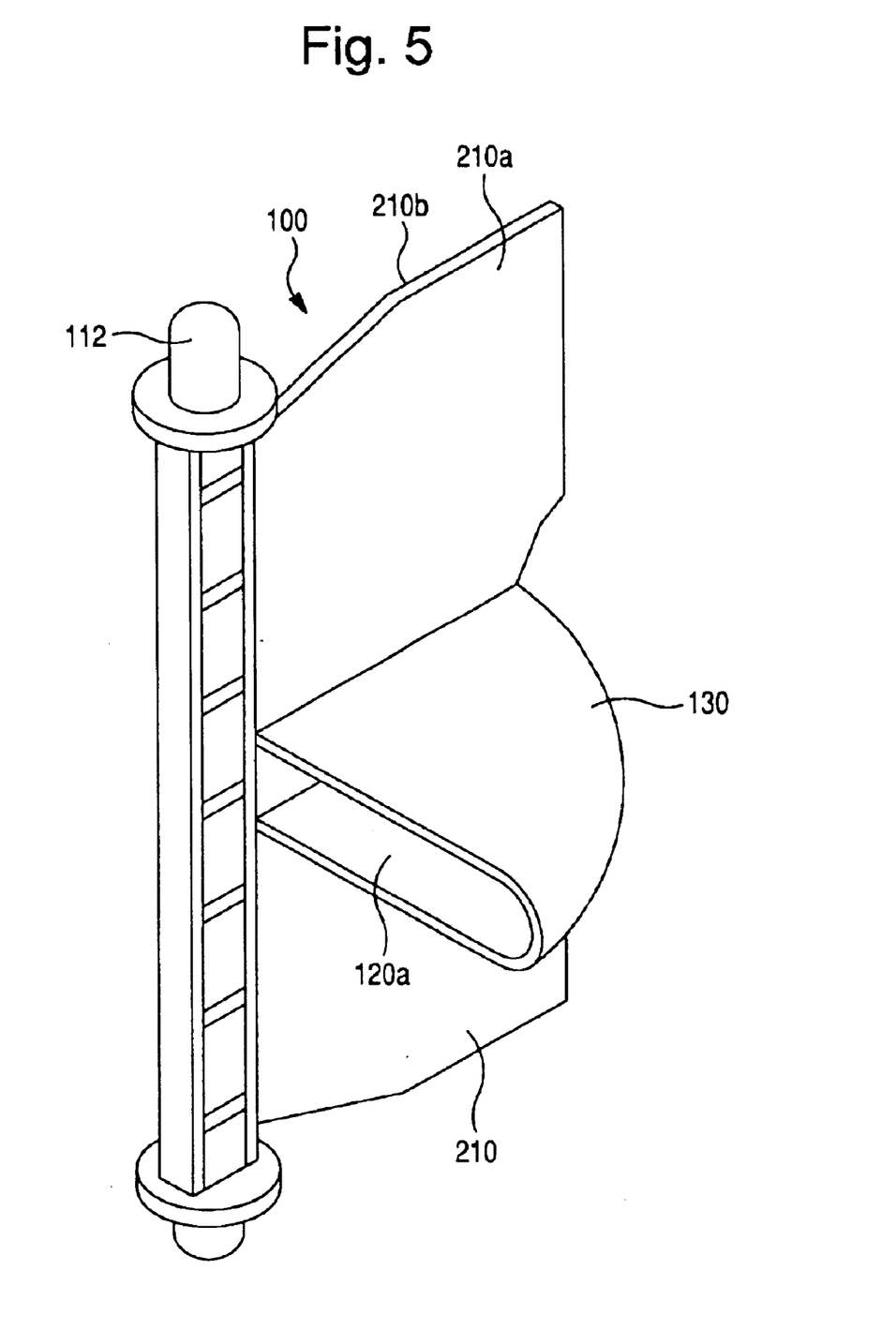
FIG. 5 is a rear perspective view of the distribution door of FIG. 4.

With reference to FIGS. 4 and 5, the u-shaped channel door 100 is formed with a primary flap member 110 attached to a post 112 defining a pivot axis 101. The primary flap member 110 has opposite sides 110a, 110b. Projecting from the first side 110a of the flap member 110 is a u-shaped deflector/scoop 130 through which a u-shaped channel 120 passes. The u-shaped channel 120 is formed at the central portion of the primary flap member 110 and defines an arcuate opening spanning a variable or tunable angle which is tunable to about 0 to 90 degrees, typically approximately 30–70 degrees. Therefore, the u-shaped channel 120 has two opposite openings 120a, 120b oriented at about a 60 degree angle with respect to each other and an arcuate wall 120c connecting these two opposite openings.

When distribution door 100 is disposed in the hot air position shown in FIG. 3a, the primary flap member 110 will substantially, but not completely, block the flow of cold air (air path 22) and will permit the flow of heated air (air flow 21) to the mixing region 24. The u-shaped channel 120 will divert a portion of the cold air-flow 22 towards the source of heated air (air flow 21) for mixture therewith before continuing to mixing region 24. This causes a more violent clash or turbulence between the two airflows substantially increasing mixing and heat transfer between the two flows resulting in a more uniformed temperature air flow emerging from mixing region 24. When the distribution door 100 is disposed in the cold air position shown in FIG. 3b, the primary flap member 110 will substantially block the flow of hot air (air path 21) and will permit unfettered flow of cold air (air flow 22) to the mixing region 24. In the position shown in FIG. 3b, the u-shaped channel 120 will permit passage of a portion of the heated airflow 21 toward the mixing region 24.

As will be understood by those of skill in the art, the distribution door 100 may be located at any intermediate position between the extreme positions shown in FIGS. 3a and 3b.

Figure 6:
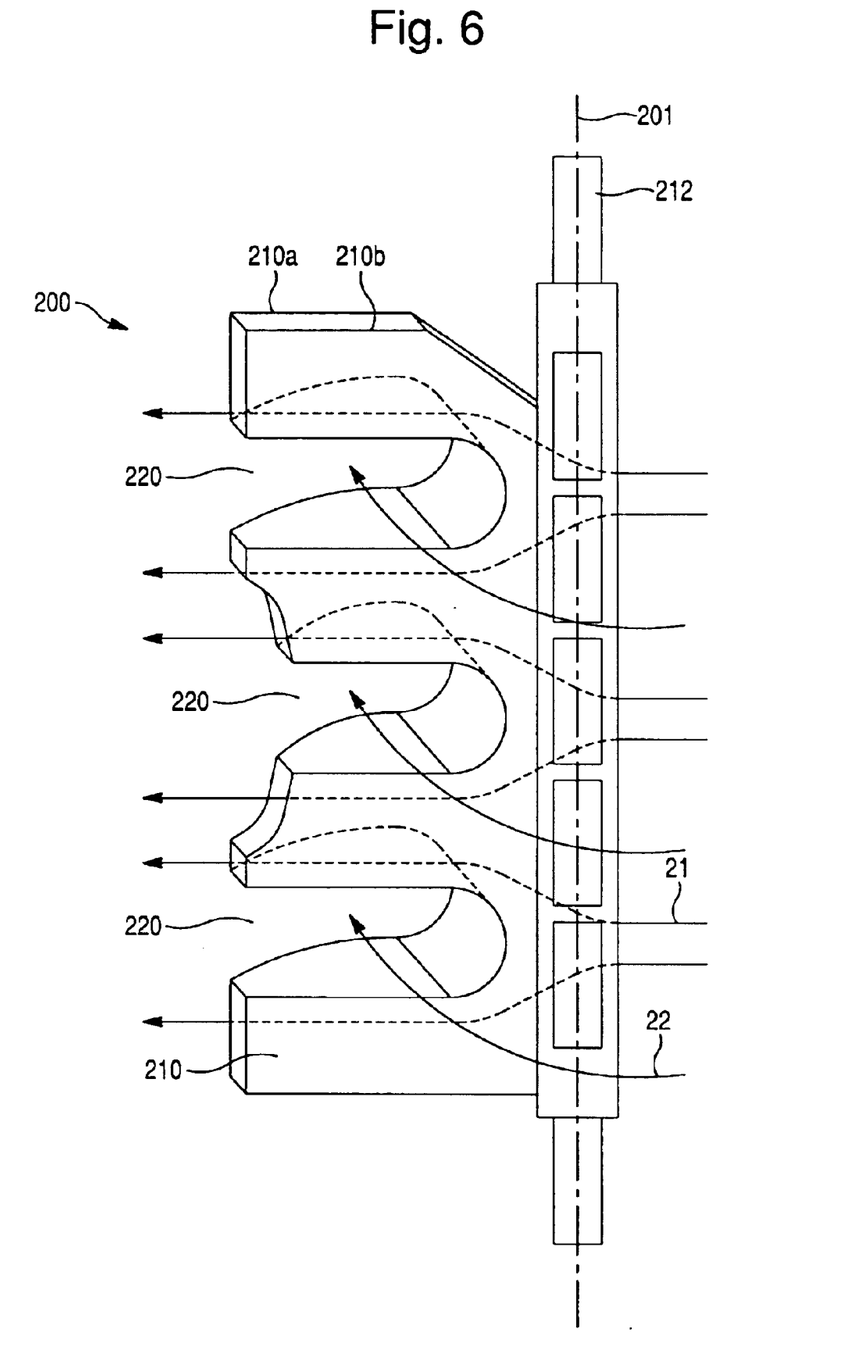
FIG. 6 is a front perspective view of the distribution door according to an alternate embodiment of the present invention in the form of a cross-flow-channels door.
Figure 7:
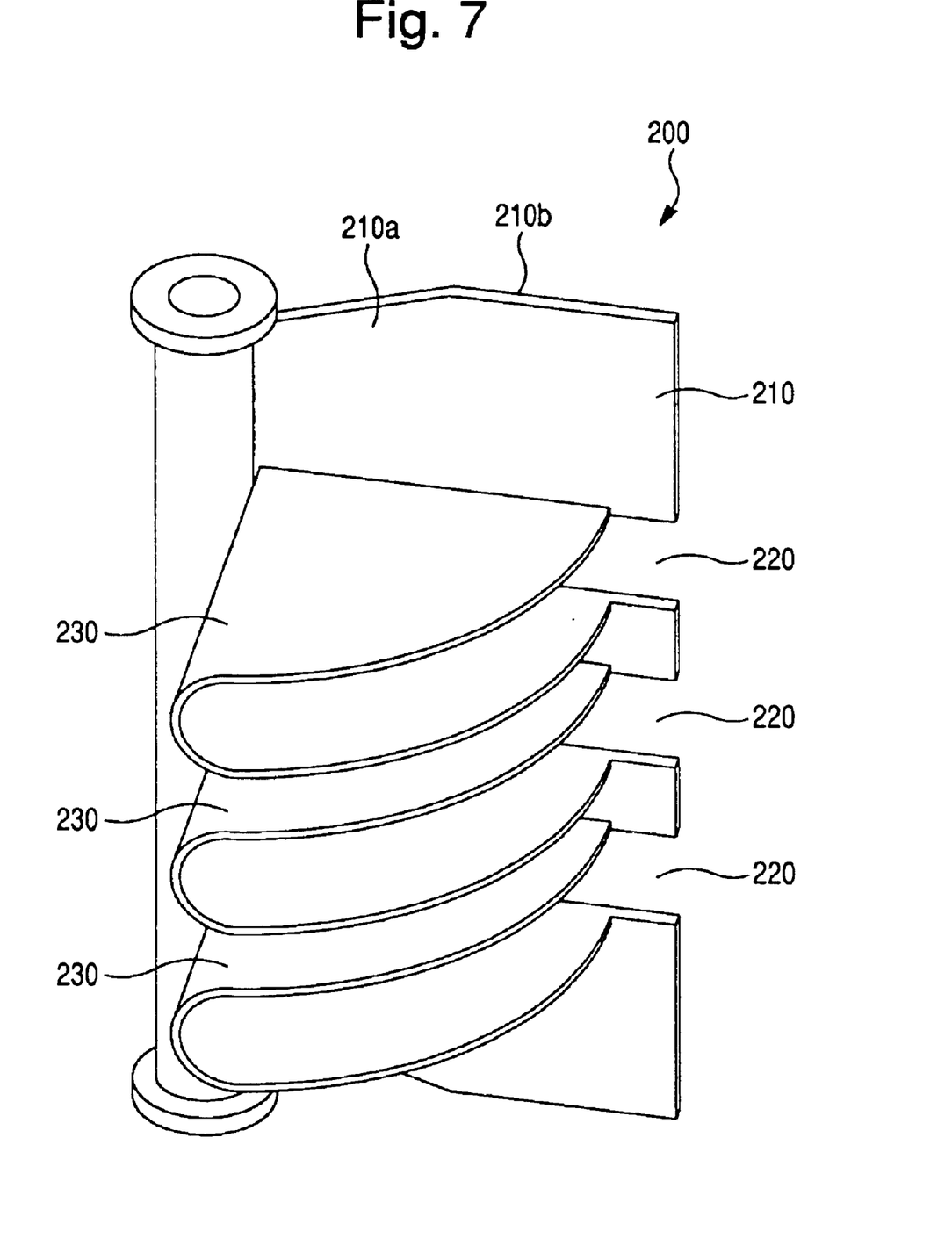
FIG. 7 is a rear perspective view of the distribution door of FIG. 6.
Figure 8:
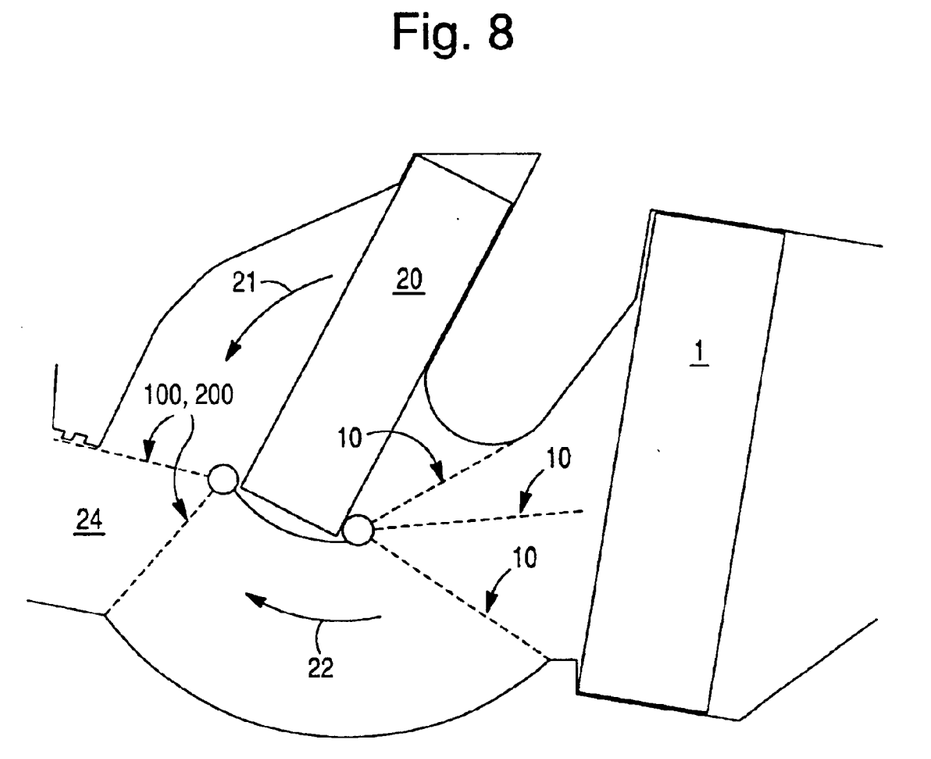
FIG. 8 is a schematic sectional view of a vehicle air conditioning system incorporating the air-mixing device of the present invention.

With reference to FIGS. 6 and 7, the cross-flow-channels door 200 is formed with a primary flap member 210 attached to a post 212 defining a pivot axis 201. The primary flap member 210 has opposite sides 210a, 210b. Formed on the primary flap member 210 is at least one u-shaped channel 220 defining an opening on the second side 210b of the flap member 210. Projecting from the first side 210a of the flap member 210 is/are corresponding u-shaped deflector(s) 230 through which each u-shaped channel 220 passes. As shown in FIG. 7, the u-shaped deflectors 230 are shaped as scoops projecting from the first side 210a.

In the preferred embodiment only one u-shaped channel 220 and deflector 230 is provided; however, FIG. 6 shows three channels 220 and deflectors 230 for illustrative purposes of the invention. As understood by one of skill in the art, the specific number of channels 220 and deflectors 230 will vary depending on the application and system design.

When distribution door 200 is disposed in the hot air position shown in FIG. 3a, the primary flap member 210 partially block the flow of cold air (air path 22) with flow permitted through the channel(s) 220. The u-shaped deflector(s) 230 permits deflected flow of heated air (air flow 21) around the u-shaped deflector(s) 230 and into the mixing region 24 (see airflow lines 21, 22 in FIG. 6). The u-shaped deflector(s) 230 and channel(s) 220 thereby interleave and co-mingle the paths of airflow 21, 22 in at least one or a plurality of alternating streams. By dividing the hot air flow 21 and cold air flow 22 into adjacent alternating flow paths, heat transfer and mixing between the two air flows 21, 22 is greatly enhanced.

When the distribution door 200 is disposed in the cold air position shown in FIG. 3b, the primary flap member 210 will primarily block the flow of hot air (air path 21) with partial flow of the hot air (air path 21) passing through the channels 220. In the position of FIG. 3b, the distribution door 200 permits unfettered flow of cold air (air flow 22) to the mixing region 24.

From the foregoing description, it will be understood by those of skill in the art that the distribution door 200 may be located at any intermediate position between the extreme positions shown in FIGS. 3a and 3b.

As described above, the present invention provides various mixing structures that commingle and interpose different airflows more efficiently within a limited space. For example, the present invention may be structured to guide more cold air to the floor registers and more hot air to the panel registers. Moreover, the invention may increase the hot air flow velocity to penetrate the cold airflow to thereby reduce bi-level stratification.

The present invention may also be structured to avoid a permanently installed cross flow baffle that generates pressure drop in the cold air path, whereby in all blend positions including a full-cold position. In such case, the stratification control door is rotated aside in the full-cold position.

While the foregoing invention has been shown and described with reference to several embodiments, it will be understood by those of skill in the art that various changes in form and detail may be made therein without departing from the spirit and scope of this invention. For example, although it is envisaged that the structures for mixing airflow will normally be made from plastics material, nevertheless it will also be possible to use metal if this should prove desirable.

We claim:

1. An air conditioning system for a vehicle having a first airflow conditioned to a first temperature and a second airflow conditioned to a second temperature, said system comprising:

a distribution door;

a first conduit for a first airflow; a second conduit for a second airflow;

a merging junction between the first conduit and the second conduit;

a distribution member for forcibly diverting at least a portion of the first airflow through the distribution door;

a merging area downstream of the merging junction;

wherein the distribution door is mounted proximate the merging junction and wherein the distribution door with the distribution member is adapted to selectively control a flow of both the first and second airflows to the merging area.

2. The air conditioning system according to claim 1, wherein said at least one distribution member is formed as a scoop or as a channel disposed in an intermediate portion of said distribution door, said scoop or channel having a U-shaped opening exposed toward said first air flow, and said scoop or channel projecting toward said second airflow and adapted to forcibly guide said at least a portion of said first air flow into said second airflow.

3. The air conditioning system according to claim 2, wherein said at least one distribution member is U-shaped.

4. The air conditioning system according to claim 1, wherein said distribution member comprises:

at least one opening formed in said distribution door facing said first air flow to divide said first airflow into at least one first air flow; and at least one projection extending from said distribution door into said second air flow, said at least one projection formed to divide said second air flow into a plurality of spaced apart second airflows;

wherein said distribution door and said distribution member are arranged to route said at least one first air flow and said second airflows in an alternating fashion thereby enhancing heat transfer and mixing of said first and second airflows to form a uniform airflow of substantially uniform temperature.

5. The air conditioning system according to claim 1, wherein said first air flow engages a evaporator to cool said first air flow, said system further comprising:

a blend door located downstream of said evaporator and pivotably mounted to selectively divert said second airflow through a heat exchanger.

6. The air conditioning system according to claim 5, wherein said distribution door is pivotable between a first position substantially blocking said second air flow and allowing said first airflow to flow through said merging region unencumbered and a second position substantially blocking said first airflow and forcibly diverting a second portion of said first airflow directly into said second airflow prior to reaching said merging area.

7. An air flow system for a vehicle air conditioning system, comprising:

a first conduit for a first airflow;

a second conduit for a second airflow;

a merging region downstream of said first and second conduits for merging said first and second air flows; and a mixing structure comprising a first side upstream of said merging region, a second side upstream of said merging region, and a substantially curved passageway leading from said first side to said second side for mixing said first and second air flows at the merging region, wherein said mixing structure defines a distribution door pivotally mounted within said system.

8. The airflow system of claim 7, wherein comprising a heat exchanger a condenser and a blend door, wherein said blend door is positioned to define the first conduit for cold air flow, said mixing structure is mounted downstream of the condenser and said blend door, and said curved passageway permits at least one of said first and second air flows to pass through an opening formed in a main body of said distribution door.

9. The air flow system of claim 8, wherein said distribution door pivots between a first position where said first side faces said first air flow and a second position where said first side is substantially aligned with said first air flow.

10. The air flow system of claim 9, said distribution door is substantially aligned with said second airflow in said first position and faces said second air flow in said second position.

11. The air flow system of claim 9, wherein, when said distribution door is in said second position, said arcuate passageway diverts a portion of said first air flow in a direction upstream of said second air flow.

12. The airflow system of claim 9, wherein, when said distribution door is in said first position, said arcuate passageway and said first side substantially block said first airflow.

13. The air flow system of claim 9, wherein, when said distribution door is in said first position, said arcuate passageway projects from said first side into said first air flow.

14. The airflow system of claim 7, wherein said first airflow is comprises heated air and said second airflow is comprises cooled air.

* * * * *